Patented Nov. 15, 1949

2,488,428

UNITED STATES PATENT OFFICE 2,488,428

POLYHYDROXYBENZENE FORMALDEHYDE RESIN ADHESIVES

Fritz J. Nagel, Emlenton, Pa., assignor to Westinghouse Electric Corporation, East Pittsburgh, Pa., a corporation of Pennsylvania No Drawing. Application September 20, 1947, Serial No. 775,385

6 Claims. (Cl. 260—54)

This invention relates to adhesives comprising polyhydroxybenzene formaldehyde compositions which may be employed to bond members by thermosetting, at room temperatures, in short periods of time.

It is desirable to prepare thermosettable resinous adhesive compositions which will set, at room temperatures, in a few hours or less. While it is known to prepare polyhydroxybenzene formaldehyde resinous compositions which are combined with both pH modifying agents and formaldehyde reacting additions, at or before the time of use of the compositions, the requisite proportioning, handling and mixing of all of these components involves certain undesirable factors. The present invention greatly reduces the after treatment of such resinous compositions and facilitates preparation of the adhesive composition.

In my copending patent application Serial No. 731,518, filed February 28, 1947, there is disclosed the preparation of polyhydroxybenzene formaldehyde reaction products which have a molar deficiency of formaldehyde and are extremely stable and non-reactive at room temperature. These compositions are rendered auto-reactive at room temperature by introducing both an alkali thereto to increase the pH to a value of 6.8 or higher and an addition of formaldehyde. The addition of the alkali is accomplished either prior to or at about the time of use of the composition as an adhesive. Apart from the inconvenience of proportioning, weighing and handling alkali, there are other drawbacks such as the danger involved, particularly to persons not acquainted with the corrosive and poisonous properties of strong alkalies. Prior to the present invention, however, the separate step of addition of an alkali to polyhydroxybenzene formaldehyde reaction products deficient molarwise in formaldehyde was practiced after reaction since addition of alkali to the reaction kettle affected the reaction product adversely. Such mixing requires the use of additional apparatus and time.

The object of this invention is to provide a polyhydroxybenzene formaldehyde composition having a molar deficiency of formaldehyde containing sufficient alkali to impart a pH of above 6.8 such that the composition is stable and rendered auto-reactive for use as a cold setting thermosetting adhesive upon the addition of the deficiency of formaldehyde alone.

A further object of the invention is to provide a process for preparing formaldehyde-deficient polyhydroxybenzene formaldehyde resinous compositions having a pH of above 6.8 which are stable.

Further objects of the invention will in part be obvious, and will in part appear hereinafter.

According to the present invention, there is initially prepared a stable resinous reaction product composed of one mole of a 1,3-polyhydroxybenzene and from 0.5 to 0.8 mole of formaldehyde, the formaldehyde being insufficient to render the reaction product thermosetting, the product having sufficient hydroxide present to impart a pH of 6.8 or higher. Upon adding, at a later time, sufficient formaldehyde to provide from 0.9 to 1.5 moles of formaldehyde per mole of polyhydroxybenzene, the resinous composition is auto-reactive such that, at room temperatures, it will thermoset and bond members in a short period of time; while, at higher temperatures, the reaction may take only a fraction of a minute.

More specifically, I react under substantially anhydrous conditions from 0.5 to 0.8 mole of formaldehyde or a polymer of formaldehyde with each mole of a polyhydroxybenzene having the unit formula

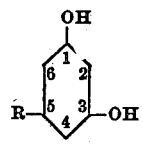

Where R is a radical selected from the group consisting of hydrogen, hydroxyl, halide, and carboxyl, and saturated hydrocarbon aliphatic and aryl radicals such as methyl, ethyl, propyl, and phenyl and having no more than one substituent for hydrogen in the 2,4,6 positions. The one substitutent in the 2,4,6 positions may be the same as comprise R. Examples of suitable polyhydroxybenzenes having the above unit formula are resorcinol, orcinol (5-methyl-1,3-dihydroxy benzene), pyrogallol (1,2,3-trihydroxy benzene), 1,3-dihydroxy-4-chlorobenzene, alpha-resorcylic acid (3,5-dihydroxy benzoic acid) and phloroglucinol (1,3,5-trihydroxy benzene).

For a controllable reaction with the polyhydroxybenzene having the above unit formula, it is necessary to employ substantially anhydrous formaldehyde or an anhydrous polymer of formaldehyde and effect the reaction in the absence of any substantial amount of water. Paraformaldehyde is a particularly good source of formaldehyde. Other polyoxymethylenes substantially free from any water may be employed in the practice of the invention. The polyhydroxybenzene also must be substantially anhydrous.

The reaction of a polyhydroxybenzene having the unit formula

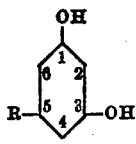

as above described, with substantially anhydrous formaldehyde or its polymers may be controllably conducted only in the presence of a substantially anhydrous, non-reactive, solvent composed of a certain minimum amount of methanol as the critical ingredient. By substantially anhydrous methanol is meant methanol with less than 2% water, preferably comprising 99% to 100% pure methanol. The anhydrous methanol must be present in an amount equal to at least 25% of the combined weight of the polyhydroxybenzene, formaldehyde and solvent. Best results have been obtained where the methanol comprises the entire solvent and is approximately 35% to 40% of the total weight of the reactants and solvent. Larger amounts of methanol may be employed with added benefits. The term "methanol" as employed herein refers to substantially anhydrous methanol.

It has been found that only anhydrous methanol enables the controlled reaction of a polyhydroxybenzene and formaldehyde or a polymer formaldehyde in any size batch, for example, 1000 gallons, with all the ingredients admixed together rapidly without undesirable or uncontrollable overheating taking place. It is well known that the reaction of a 1,3-polyhydroxybenzene and formaldehyde is extremely violent and ordinarily cannot be conducted with adequate control, or without the production of overreacted resin if the entire batch of reactants is mixed together.

While the anhydrous solvent employed as the reaction medium must contain methanol as the critical ingredient, it may be desirable to add other low boiling point non-reactive solvents that are stable and non-reactive in the presence of formaldehyde and the polyhydroxybenzene, providing the boiling point of such added solvent does not exceed 100° C. and that the reflux temperature does not appreciably exceed 100° C. Anhydrous ethanol, isopropanol, n-butanol, ethyl acetate, n-butyl acetate and ethyl propionate may be combined with the methanol for this purpose. In any event, the proportion of methanol to the entire reaction mixture including the solvent should be at least 25%, higher proportions giving a correspondingly better product with regard to stability, as well as easier reaction control. The other components of the solvent, other than methanol, act as diluents and do not appreciably contribute to the control of the reactivity of the polyhydroxybenzene and formaldehyde.

For producing the base resinous reaction product, one mole of a 1,3-polyhydroxybenzene such, for example, as resorcinol, is combined with from 0.5 to 0.8 mole of anhydrous formaldehyde or a polymer thereof, such as paraformaldehyde. Optimum adhesive strength has been secured when 0.65 mole of formaldehyde has been reacted with each mole of resorcinol. These proportions will produce a relatively non-thermosetting resinous product characterized by high stability.

In preparing the resinous composition suitable for use as an adhesive, an alkaline catalyst is required. The amount of alkaline catalyst may be varied, depending upon its relative reactivity. Thus, a catalyst of intermediate strength, such as ammonium hydroxide, may be employed in an amount equal to 0.1% of the weight of the polyhydroxybenzene. Ethylene diamine may be employed in an amount up to 0.2% of the weight of the polyhydroxybenzene. Alkali metal or alkaline earth metal hydroxides are relatively strong catalysts and are preferably employed in amounts of not exceeding 0.1% of the weight of the polyhydroxybenzene. Examples of suitable hydroxides of the group of alkali metal and alkaline earth metal hydroxides are sodium hydroxide, potassium hydroxide, calcium hydroxide, barium hydroxide, cesium hydroxide and lithium hydroxide. Other suitable alkaline catalysts are hexamethylenetetramine, ethanolamines, phenylene diamine and organic compounds that exhibit alkaline properties. The compounds having higher pH's in water solution are ordinarily more powerful catalysts, and accordingly must be employed in correspondingly smaller amounts than those having a lower pH.

It has been found that when the polyhydroxybenzene and formaldehyde are introduced into the non-reactive solvent containing methanol, all the reactants being anhydrous, and upon heating the reactants, a brief initial moderately violent reaction occurs. A reaction kettle equipped with the usual reflux condenser is able to keep this stage of the reaction within control; and, within five minutes, usually in two or three minutes, the violence of the reaction abates considerably and the reaction proceeds quite smoothly. For this reason, only a small amount of alkaline catalyst is added initially since, with a great excess of alkaline catalyst initially present, the reaction may tend to become almost uncontrollable.

After the initial relatively violent reaction has taken place between the polyhydroxybenzene and formaldehyde, there may be added a hydroxide of the alkali metal or the alkaline earth metal in an amount sufficient to impart a pH of 6.8 and higher to the solution. The metal hydroxide may be added in small increments, while the solution is refluxing, whereby the hydroxide will dissolve and be distributed evenly therein. If desired, the required total amount of metal hydroxide may be added toward the end of the reaction. For the purpose of this invention, the amount of metal hydroxide should be equal to from 0.5 to 10% of the weight of the polyhydroxybenzene. Good results for most practical uses have been obtained when the amount of metal hydroxide has been from 1% to 2% of the weight of the polyhydroxybenzene.

It has been found that the reaction of polyhydroxybenzene and formaldehyde may be sufficiently complete for the purpose of this invention in one-quarter of an hour of refluxing. However, in order to insure that the formaldehyde and polyhydroxybenzene are more fully reacted with one another refluxing for from thirty minutes to one and a half hours is recommended. It has been found that after about one hour, the viscosity of the reaction product increases but slightly. Even after prolonged refluxing for four hours or more, very little change in viscosity is noted. This is due to the fact that the formaldehyde is molarly deficient with respect to the polyhydroxybenzene and the limited degree of reaction which can occur appears to go to relative completion in a short period of time. In the presence of methanol, the product cannot be overreacted at reflux temperatures with the formation of undesirable end-products.

It is particularly advantageous to catalyze the initial reaction by adding not in excess of 0.1% of a metal hydroxide, such as sodium hydroxide, and after approximately five minutes of refluxing during which the most violent portion of the reaction of the polyhydroxybenzene and formaldehyde has taken place, to add in increments the remainder of the sodium hydroxide to provide a total amount of from 0.5% to 10% based on the weight of the polyhydroxybenzene. Carrying out this combined step in the reaction vessel enables a saving both in apparatus and of time which would be required if the metal hydroxide were to be added later in a separate step.

The reactants comprising polyhydroxybenzene and formaldehyde in the anhydrous solvent of which methanol is a substantial proportion, as indicated herein, may be treated with the metal hydroxide in solid form, such, for example, as flakes, pellets, or powder, without difficulty. For some purposes, the metal hydroxide may be dissolved in methanol or ethanol and added in solution form to the reaction vessel. If the metal hydroxide is added in solid form, provision should be made to insure that the solid hydroxide particles are stirred vigorously in order to prevent their collecting at the bottom of the reaction vessel. Adding the metal hydroxide in this form maintains a substantially anhydrous reaction product. For some purposes, the hydroxide may be dissolved in a small amount of water, for example in an amount equal to that of the metal hydroxide, before addition to the reaction kettle. This amount of water is insufficient to affect the reaction—usually being far less than 1% of the weight of solution.

After the reaction of the polyhydroxybenzene and formaldehyde has been completed, there is obtained a unitary solution of the resinous composition in the solvent which contains the required amount of the alkali, suitable for use as an adhesive by simply adding formaldehyde thereto. Tests have indicated that the solution contains less than 0.2% water. It is believed that such small amounts of water are not free.

The following examples in which all parts are by weight illustrate the preparation of the compositions of this invention.

Example I

|  | Parts | Moles |
| --- | --- | --- |
| Resorcinol | 440 | 4 |
| Paraformaldehyde | 78 | 2.6 |
| Methanol | 250 |  |
| Concentrated ammonium hydroxide | ½ |  |

The ingredients are combined by placing the methanol in a closed reaction vessel adding the resorcinol and then introducing all the paraformaldehyde. The reaction vessel is equipped with a mechanical stirrer, reflux condenser, heating and cooling means, and the usual controls. The mixture is refluxed with constant stirring for ten minutes during which time the temperature will rise to from 75° C. to 85° C., then 100 parts of the methanol are distilled off at atmospheric pressure over a period of thirty minutes, the temperature not exceeding 85° during this operation. At this time, a solution composed of 29 parts by weight of ethanol containing 9 parts by weight of sodium hydroxide are introduced into the reaction vessel. The mixture is refluxed for three minutes longer, and then the solution is cooled. The solution so prepared will have a pH of about 7.5. The total time required is about one hour. No extra labor or supervision is required in preparing the complete product over that normally used in reacting the resinous ingredients proper.

For use as an adhesive, the solution from Example I is simply admixed with from 30 to 180 parts of paraformaldehyde. When applied to members, such as wood, the composition will thermoset in from four to eight hours to provide a good adhesive bond. The bond strength will slowly increase on standing for several days.

Example II

|  | Parts | Moles |
| --- | --- | --- |
| Resorcinol | 440 | 4 |
| Paraformaldehyde | 96 | 3.2 |
| Methanol (99% to 100%) | 250 |  |
| Sodium hydroxide | ¼ |  |

After admixture, the reflux time of the ingredients in the reaction vessel is five minutes. Thereafter 8 parts by weight of sodium hydroxide pellets are added to the reaction vessel. Refluxing is continued for an additional thirty minutes and 100 parts by weight of the methanol is removed by distillation during this period. A stable resinous solution will result and it may be stored for long periods of time without deterioration in properties.

The sodium hydroxide may be added in either Examples I or II in small increments at regular intervals after the first five-minute period of reaction, or in entirety at any time, care being taken to insure that it is stirred in vigorously for complete dissolution in the solvents. Finely divided hydroxide is preferred because of ease of dissolution.

In preparing an adhesive from the compositions containing sufficient hydroxide giving a pH of 6.8 or higher as derived from the reaction vessel, there need be added only formaldehyde or a polymer of formaldehyde immediately preceding the application of such composition as the adhesive. The amount of formaldehyde thus added should be sufficient to provide a total of from 0.9 to 1.5 moles of formaldehyde, including the originally present formaldehyde, per mole of polyhydroxybenzene. With this additional formaldehyde, the alkaline solution of reaction product becomes a potentially auto-reactive composition that will thermoset at temperatures as low as 40° F. and lower. As the temperature is increased, the thermosetting time will decrease markedly until, at 100° C., only a few seconds are required.

The formaldehyde, such as paraformaldehyde, which is added to the solution of resinous reaction product to render it thermosetting, may desirably contain finely powdered nut shells, such as walnut-shell or cocoanut-shell flour. The finely powdered nut shells, which may be present in an amount equal to the weight of the resinous reaction product itself, have been found to improve the body and bond-strength of the adhesive. By combining the paraformaldehyde and the walnut-shell flour with each other prior to admixture with the solution, the one mixing will distribute both throughout the solution. The following example indicates this practice.

Example III

The resinous composition of Example I is admixed with walnut-shell flour and paraformaldehyde in the proportion of 100 parts by weight of the solution to a mixture of 25 parts of walnut-shell flour and 20 parts of paraformaldehyde. The complete mixture may be applied to members for adhesive purposes. The working-life of the composition will be approximately four hours at 70° F. It will gel in about six to eight hours and become thermoset in about twelve hours. After thermosetting, the bond-strength will increase for a period of about one week to a maximum value.

The resinous compositions described herein can be applied to many types of materials for the purpose of bonding them. Wood of all forms may be bonded into laminated members of any desirable shape and size. Cloth and other cellulosic fabrics may be applied to various bodies by means of the adhesive compositions disclosed herein.

Resinous products, such, for example, as phenolic laminates, may be bonded to one another or to wood, cloth or the like, by application of the adhesives. Rubber, both natural and synthetic, may be bonded by means of the adhesives. Numerous other bodies having a porous surface into which the adhesive can penetrate and secure lodgement may be treated with the compositions and bonded to one another.

The adhesives prepared as described herein are preferably applied to both surfaces to be bonded and dried sufficiently to eliminate most of the solvent from the layers, and then the surfaces superimposed and pressed together with sufficient pressure to contact each other fully. Pressures of from ten to a hundred pounds per square inch have been found satisfactory for most purposes, but higher pressures may be employed. The prepared compositions containing the resinous reaction product with added formaldehyde, with or without the nut shell flour, may be applied by brushing, dipping, roller-coating, or the like. Before the adhesive has gelled, it may be readily removed from the brushes or rolls by washing with cold water in which it is quite soluble. It is relatively non-corrosive and therefore may be safely applied with usual equipment.

It will accordingly be apparent that a relatively simple mixing operation is all that is required to prepare an adhesive composition from the hydroxide containing reaction product. The problem of admixing alkali as a separate step is completely eliminated. This renders the application of the compositions safer and more convenient than was possible heretofore.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. The process of producing a substantially anhydrous polyhydroxybenzene formaldehyde reaction product suitable for use as a cold setting adhesive upon the addition of formaldehyde alone, comprising reacting under reflux for at least one-quarter hour one mole of an anhydrous polyhydroxybenzene having the unit formula

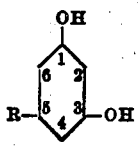

where R is a radical selected from the group consisting of hydrogen, hydroxyl, halide, carboxyl, saturated hydrocarbon aliphatic and phenyl radicals and having not more than one substituent also selected from the group for hydrogen in the 2, 4, 6 positions, and from 0.5 to 0.8 mole of anhydrous aldehyde selected from the group consisting of formaldehyde and its polymers in a non-reactive solvent having less than 2% water, the solvent comprising methanol in an amount equal to at least 25% of the total weight of the reactants and the solvent, in the presence of an alkaline polymerization catalyst in an amount not in excess of the order of 0.1% to 0.2% of the weight of the polyhydroxybenzene to insure a moderate initial reaction and after five minutes reflux adding to the solution a hydroxide selected from the group consisting of alkali metal hydroxides and alkaline earth metal hydroxides, the hydroxide being in an amount equal to from 0.5% to 10% of the weight of the polyhydroxybenzene, to provide a solution having a pH of at least 6.8.

2. The process of producing a substantially anhydrous resorcinol formaldehyde reaction product suitable for use as a cold setting adhesive when additional formaldehyde alone is added thereto, comprising refluxing for at least one-quarter hour one mole of anhydrous resorcinol, from 0.5 to 0.8 mole of an anhydrous aldehyde selected from the group consisting of formaldehyde and polymers of formaldehyde in a non-reactive solvent having less than 2% water, the solvent comprising methanol in an amount equal to at least 25% of the total weight of resorcinol, aldehyde and solvent, in the presence of an alkaline polymerization catalyst in an amount not in excess of the order of 0.1% to 0.2% of the weight of the resorcinol for the reaction in an amount to insure a moderate initial reaction, and after five minutes reaction introducing during the refluxing period a hydroxide selected from the group consisting of alkali metal hydroxides and alkaline earth metal hydroxides, the hydroxide being in an amount of from 0.5% to 10% of the weight of the resorcinol, and dissolving the hydroxide in the solution to provide a pH of above 6.8.

3. The process of producing a substantially anhydrous resorcinol formaldehyde reaction product suitable for use as a cold setting adhesive when additional formaldehyde alone is added thereto, comprising reacting under reflux for at least one-quarter hour one mole of anhydrous resorcinol, from 0.5 to 0.8 mole of an anhydrous aldehyde selected from the group consisting of formaldehyde and polymers of formaldehyde in a non-reactive solvent having less than 2% water, the solvent comprising methanol in an amount equal to at least 25% of the total weight of resorcinol, aldehyde and solvent, in the presence of not more than 0.1%, based on the weight of the resorcinol, of a hydroxide selected from the group consisting of alkali metal hydroxides and alkaline earth metal hydroxides, and after the initial vigorous reaction terminates introducing additional hydroxide to a total amount of from 0.5% to 10% of the weight of the resorcinol, the hydroxide dissolving in the solution to provide a pH of above 6.8.

4. The process of producing a substantially anhydrous polyhydroxybenzene formaldehyde reaction product suitable for use as a cold setting adhesive upon the addition of formaldehyde alone, comprising reacting under reflux for at least one-quarter hour one mole of an anhydrous polyhydroxybenzene having the unit formula

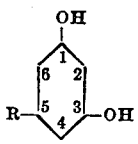

where R is a radical selected from the group consisting of hydrogen, hydroxyl, halide, carboxyl, saturated hydrocarbon aliphatic and phenyl radicals and having not more than one substituent also selected from the group for hydrogen in the 2, 4, 6 positions, and from 0.5 to 0.8 mole of anhydrous aldehyde selected from the group consisting of formaldehyde and its polymers in non-reactive solvent having less than 2% water, the solvent comprising methanol in an amount equal to at least 25% of the total weight of the reactants and the solvent, and adding to the solution a hydroxide selected from the group consisting of alkali metal hydroxides and alkaline earth metal hydroxides, the hydroxide being in an amount equal to from 0.5% to 10% of the weight to the polyhydroxybenzene, to provide a solution having a pH of at least 6.8, the hydroxide being introduced in increments beginning with an amount of not in excess of 0.1% of the weight of the polyhydroxybenzene initially, the remainder of the hydroxide being added after approximately five minutes refluxing has taken place.

5. A stable resinous composition that is convertible into a thermosetting adhesive at room temperature by the addition of formaldehyde alone comprising the reaction product derived by reacting under reflux for at least one-quarter hour one mole of an anhydrous polyhydroxybenzene having the unit formula

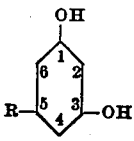

where R is a radical selected from the group consisting of hydrogen, hydroxyl, halide, carboxyl, saturated hydrocarbon aliphatic and phenyl radicals and having not more than one substituent also selected from the group for hydrogen in the 2, 4, 6 positions, and from 0.5 to 0.8 mole of anhydrous aldehyde selected from the group consisting of formaldehyde and its polymers in a non-reactive solvent having less than 2% water, the solvent comprising methanol in an amount equal to at least 25% of the total weight of the reactants and the solvent, in the presence of an alkaline polymerization catalyst in an amount not in excess of the order of from 0.1% to 0.2% of the weight of the polyhydroxybenzene to insure a moderate intial reaction and after five minutes reflux adding to the solution a hydroxide selected from the group consisting of alkali metal hydroxides and alkaline earth metal hydroxides, the hydroxide being in an amount equal to from 0.5% to 10% of the weight of the polyhydroxybenzene, to provide a solution having a pH of at least 6.8.

6. A stable resinous composition that is convertible into a thermosetting adhesive at room temperature by the addition of formaldehyde alone comprising the reaction product derived by reacting under reflux for at least one-quarter hour one mole of anhydrous resorcinol, from 0.5 to 0.8 mole of an anhydrous aldehyde selected from the group consisting of formaldehyde and polymers of formaldehyde in a non-reactive solvent having less than 2% water, the solvent comprising methanol in an amount equal to at least 25% of the total weight of resorcinol, aldehyde and solvent, in the presence of an alkaline polymerization catalyst for the reaction in an amount not in excess of the order of from 0.1% to 0.2% of the weight of the resorcinol to insure a moderate initial reaction, and after five minutes reaction introducing during the refluxing period a hydroxide selected from the group consisting of alkali metal hydroxides and alkaline earth metal hydroxides, the hydroxide being in an amount of from 0.5% to 10% of the weight of the resorcinol, and dissolving the hydroxide in the solution to provide a pH of above 6.8.

FRITZ J. NAGEL.

No references cited.